US00RE37111E

(19) United States
(12) Reissued Patent
Barron

(10) Patent Number: US RE37,111 E
(45) Date of Reissued Patent: Mar. 27, 2001

(54) RIFLE SLING SUPPORT APPARATUS

(76) Inventor: Rick W. Barron, 7018 Catlen Way, Sacramento, CA (US) 95831

(21) Appl. No.: 09/172,898

(22) Filed: Oct. 15, 1998

Related U.S. Patent Documents

Reissue of:
(64) Patent No.: 5,564,610
Issued: Oct. 15, 1996
Appl. No.: 08/393,436
Filed: Feb. 23, 1995

(51) Int. Cl.[7] ..... A45F 5/00
(52) U.S. Cl. ..... 224/268; 224/197; 224/675; 224/678; 224/901.4; 224/913
(58) Field of Search ..... 224/191, 197, 224/198, 199, 200, 268, 269, 271, 272, 660, 665, 674, 675, 911, 912, 913, 149, 150; D3/222

(56) References Cited

U.S. PATENT DOCUMENTS

| | | | | |
|---|---|---|---|---|
| D. 162,904 | * | 4/1951 | Ulvang | 224/913 X |
| D. 269,306 | | 6/1983 | Middleton . | |
| D. 311,813 | | 11/1990 | Oliver . | |
| 475,640 | | 5/1892 | Unger . | |
| 636,295 | | 11/1899 | Sibthorpe . | |
| 1,469,285 | | 10/1923 | Thompson . | |
| 2,526,768 | | 10/1950 | Pendergrass . | |
| 2,543,703 | * | 2/1951 | Pelto | 224/149 |
| 2,778,552 | * | 1/1957 | Thomspon | 224/197 X |
| 2,856,111 | | 10/1958 | Wolfe et al. . | |
| 3,910,469 | | 10/1975 | Baldocchi . | |
| 3,963,156 | * | 6/1976 | Perrin | 224/268 |
| 4,504,001 | | 3/1985 | Nichols . | |
| 4,572,415 | * | 2/1986 | Fehr | 224/675 |
| 4,662,552 | * | 5/1987 | Uyehara | 224/675 X |
| 4,863,083 | | 9/1989 | Chen . | |
| 5,060,835 | | 10/1991 | Payne . | |
| 5,086,758 | | 2/1992 | Schick, Sr. et al. . | |
| 5,564,610 | * | 10/1996 | Barron | 224/268 |

FOREIGN PATENT DOCUMENTS

| | | | | |
|---|---|---|---|---|
| 235967 | | 6/1911 | (DE) | 224/913 |
| 2227510 | * | 12/1974 | (FR) | 224/149 |

* cited by examiner

*Primary Examiner*—Gregory M. Vidovich

(57) ABSTRACT

A rifle sling support apparatus including an elongated belt securement strap having a base end, a tip end, and a securement mechanism affixed to the ends for securing the strap in a closed loop configuration about a belt fastened about a user's waist; a hook having an upper end, a lower end, a bend therebetween, and a pair of opposed cutouts formed on the bend and with each cutout sized for receiving a pistol grip or a stock of a rifle; and a hook angle adjustment mechanism secured between the belt securement strap and hook for adjusting the angular position of the hook with respect to the belt securement strap.

9 Claims, 4 Drawing Sheets

RIFLE SLING SUPPORT APPARATUS

Matter enclosed in heavy brackets [ ] appears in the original patent but forms no part of this reissue specification; matter printed in italics indicates the additions made by reissue.

BACKGROUND OF THE INVENTION

1. Field of the Invention

The present invention relates to a rifle sling support apparatus and more particularly pertains to allowing a slinged rifle to be conveniently carried by a user from one location to another and for eliminating undue stress on the user's shoulder with a rifle sling support apparatus.

2. Description of the Prior Art

The use of weapon sling or belt holders is known in the prior art. More specifically, weapon sling or belt holders heretofore devised and utilized for the purpose of carrying a weapon from one location to another are known to consist basically of familiar, expected and obvious structural configurations, notwithstanding the myriad of designs encompassed by the crowded prior art which have been developed for the fulfillment of countless objectives and requirements.

By way of example, U.S. Pat. No. Des. 269,306 to Middleton discloses a belt mounted holder for golf tees, rifle caps, or similar article. U.S. Pat. No. Des. 311,813 to Oliver discloses a rifle backpack. U.S. Pat. No. 4,863,083 to Chen discloses a ski and boot carrying waist belt. U.S. Pat. No. 5,060,835 to Payne discloses a belt-type personal carrier apparatus for conveniently support a beverage container and other belongings about the person's waist. U.S. Pat. No. 5,086,758 to Schiek, Sr. et al. discloses a belt support device with adjustable hook and loop-type fastener.

While these devices fulfill their respective, particular objective and requirements, the aforementioned patents do not describe a rifle sling support apparatus that provides additional support for allowing a user to easily carry a slinged rifle or other similar weapon about his shoulder and across his back.

In this respect, the rifle sling support apparatus according to the present invention substantially departs from the conventional concepts and designs of the prior art, and in doing so provides an apparatus primarily developed for the purpose of allowing a slinged rifle to be conveniently carried by a user from one location to another and for eliminating undue stress on the user's shoulder.

Therefore, it can be appreciated that there exists a continuing need for new and improved rifle sling support apparatus which can be used for allowing a slinged rifle to be conveniently carried by a user from one location to another and for eliminating undue stress on the user's shoulder. In this regard, the present invention substantially fulfills this need.

SUMMARY OF THE INVENTION

In the view of the foregoing disadvantages inherent in the known types of weapon sling or belt holders now present in the prior art, the present invention provides an improved rifle sling support apparatus. As such, the general purpose of the present invention, which will be described subsequently in greater detail, is to provide a new and improved rifle sling support apparatus and method which has all the advantages of the prior art and none of the disadvantages.

To attain this, the present invention essentially comprises, in combination, a belt securable about a user's waist. An elongated belt securement strap is included and has a base end, a tip end, an intermediate portion therebetween with a through hole formed thereon, and a pair of snap fasteners affixed to the ends. The fasteners are removably securable for placing the belt securement strap in a closed loop configuration about the belt. A rubber-coated hook is included and has an upper end, a lower end, a bend therebetween, a generally straight long segment with a through hole formed thereon extended between the upper end and an inboard portion of the bend, and a short segment extended between an outboard portion of the bend and the lower end. The hook also has an inboard surface, an outboard surface, and a pair of opposed curved side edges interconnecting the surfaces. Each side edge includes a generally crescent-shaped cutout formed thereon at a location coincident with the bend. Each cutout is sized for receiving a pistol grip or a stock of a rifle.

A hook angle adjustment mechanism is also provided for adjusting the angular position of the hook with respect to the belt securement strap. The hook angle adjustment mechanism includes an annular rigid first plate having a smooth inboard surface affixed to the belt securement strap in axial alignment with its through hole, an outboard surface with a plurality of spaced concave indentations formed thereon in a circular fashion, and an inboard peripheral edge interconnecting the surfaces. The hook angle adjustment mechanism includes an annular rigid second plate having a smooth outboard surface affixed to the hook in axial alignment with its through hole, an inboard surface with a plurality of spaced convex detents projected outwards therefrom in a circular fashion, and an outboard peripheral edge interconnecting the surfaces. Lastly, the hook angle adjustment mechanism includes a rivet extended within the through holes of the belt securement strap and the hook and further extended through the plates to thereby sandwich the plates between the belt securement strap and the hook and place the detents of the second plate in rotatable snap-type relation with the indentations of the first plate.

A strip of pile-type fastener is included and affixed to the outboard surface of the hook near the lower end thereof. Lastly, a flexible rifle securement strap is included and has an upper end affixed to the long segment of the hook and a lower end with a strip of complimentary pile-type fastener affixed thereto. The complimentary pile-type fastener is removably securable to the pile-type fastener on the hook to define a closed loop configuration between the hook and the rifle securement strap.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved rifle sling support apparatus which has all the advantages of the prior art weapon sling or belt holders and none of the disadvantages.

It is another object of the present invention to provide a new and improved rifle sling support apparatus which may be easily and efficiently manufactured and marketed.

It is a further object of the present invention to provide a new and improved rifle sling support apparatus which is of durable and reliable construction.

An even further object of the present invention is to provide a new and improved rifle sling support apparatus which is susceptible of a low cost of manufacture with regard to both materials and labor, and which accordingly is then susceptible of low prices of sale to the consuming public, thereby making such a rifle sling support apparatus economically available to the buying public.

Still yet another object of the present invention is to provide a new and improved rifle sling support apparatus which provides in the apparatuses and methods of the prior art some of the advantages thereof, while simultaneously overcoming some of the disadvantages normally associated therewith.

Even still another object of the present invention is to provide a new and improved rifle sling support apparatus for allowing a slinged rifle to be conveniently carried by a user from one location to another and for eliminating undue stress on the user's shoulder.

Lastly, it is an object of the present invention to provide a new and improved rifle sling support apparatus comprising an elongated belt securement strap having a base end, a tip end, and securement means affixed to the ends for securing the strap in a closed loop configuration about a belt fastened about a user's waist; a hook having an upper end, a lower end, a bend therebetween, and a pair of opposed cutouts formed on the bend and with each cutout sized for receiving a pistol grip or a stock of a rifle; and a hook angle adjustment means secured between the belt securement strap and hook for adjusting the angular position of the hook with respect to the belt securement strap.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

The same reference numerals refer to the same parts through the various Figures.

DESCRIPTION OF THE PREFERRED EMBODIMENT

Figure 1:
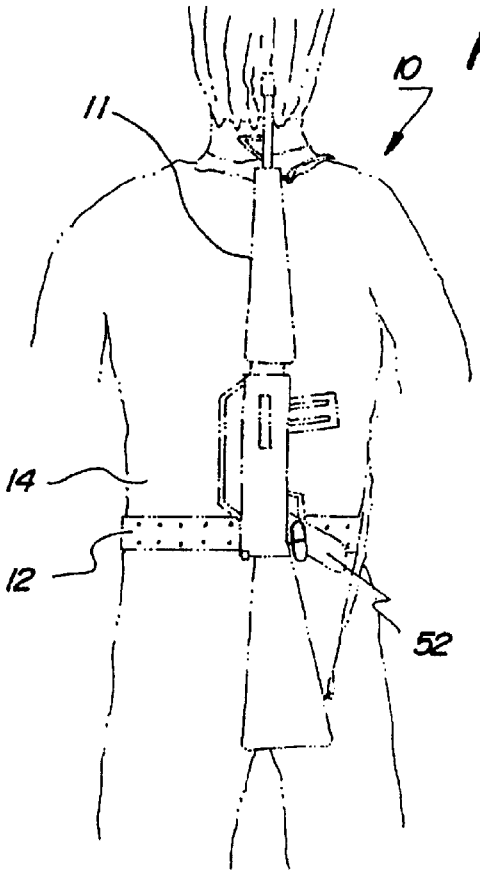
FIG. 1 is a side-elevational view of the preferred embodiment constructed in accordance with the principles of the present invention in use with a belt for holding an M-16 rifle in a slinged position about the shoulder and the back of a user.

With reference now to the drawings, and in particular, to FIG. 1 thereof, the preferred embodiment of the new and improved rifle sling support apparatus embodying the principles and concepts of the present invention and generally designated by the reference number 10 will be described.

The present invention is comprised of a plurality of components. In their broadest context, such components include a belt, straps, a hook, and a hook angle adjustment mechanism. Such components are individually configured and correlated with respect to each other to provide the intended function of allowing a user to carry a slinged rifle 11 from one location to another and eliminate undue stress placed on his shoulder.

Specifically, the present invention includes a belt 12 as shown in FIG. 1. The belt is securable about a user's waist 14. The belt can be formed of leather or a canvas-type material. In the preferred embodiment, the belt is formed of a canvas-type material with a plurality of grommets secured thereto. The grommets are used for holding ancillary hooked items such as pouches and the like.

Figure 2:
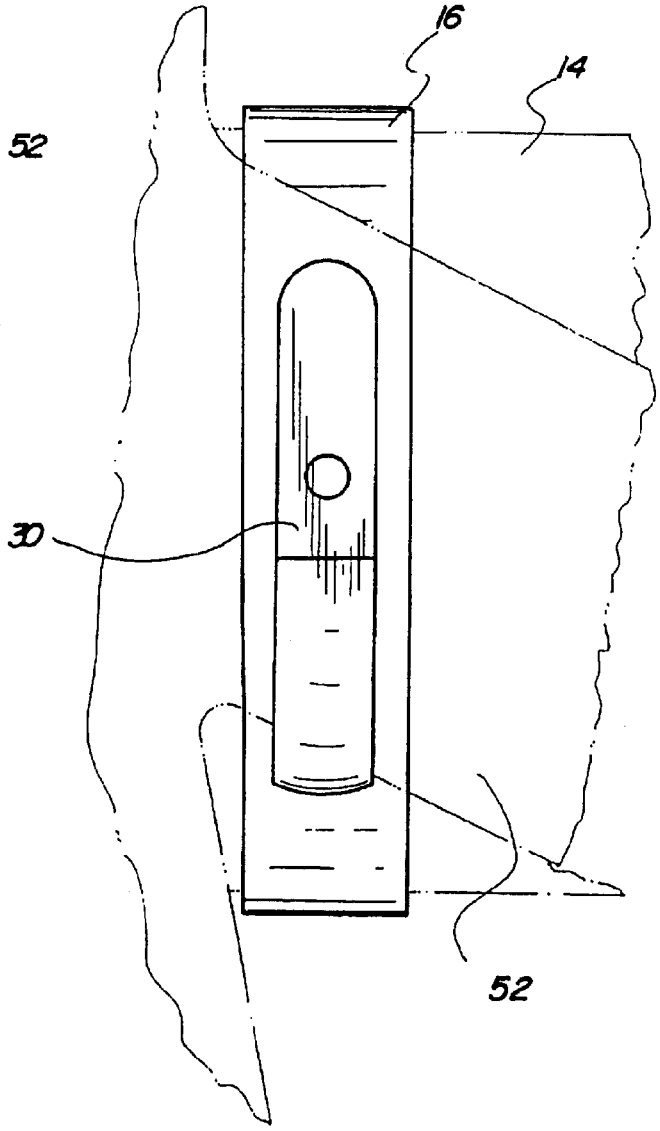
FIG. 2 is an enlarged side-elevational view of the present invention and its association with the belt and grip of the M-16 rifle as shown in FIG. 1.
Figure 3:
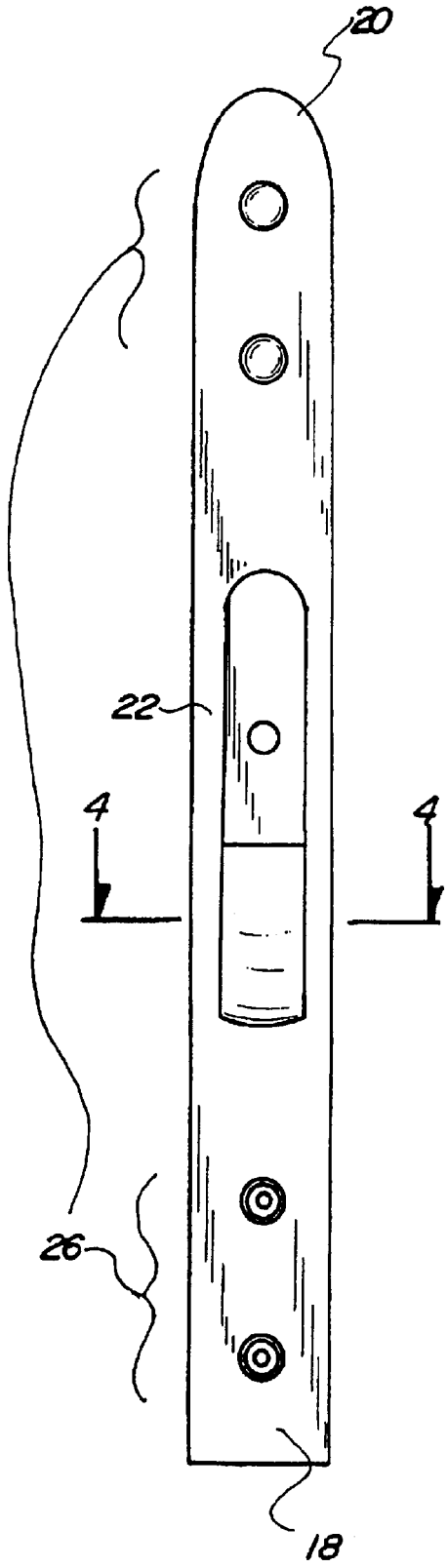
FIG. 3 is yet another side-elevational view of the present invention in a configuration decoupled from the belt of a user.

A belt securement strap 16 is also provided as shown in FIG. 2. The belt securement strap is elongated in structure and formed of leather or a canvas-type material. The belt securement strap has a squared-off base end 18, a rounded tip end 20, and an intermediate portion 22 therebetween as shown in FIG. 3. In addition, a generally circular through hole 24 is formed on the intermediate portion. A pair of metal snap fasteners 26 are affixed to the ends of the belt securement strap. The snap fasteners are removably securable for placing the belt securement strap in a closed loop configuration about the belt 14 as shown in FIG. 2. In the preferred embodiment, the strap has a length of about 6 to 7 inches and a width of about ¾ to 1¼ inches.

Figure 4:
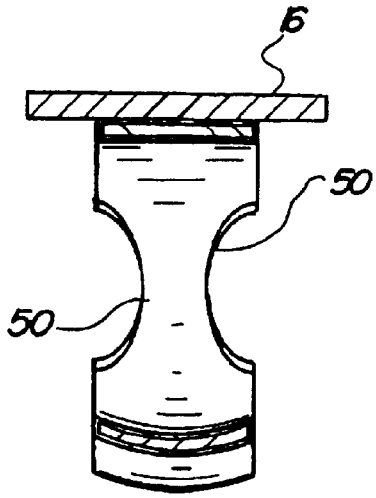
FIG. 4 is a cross-sectional view of the present invention taken along the line 4—4 of FIG. 3.
Figure 5:
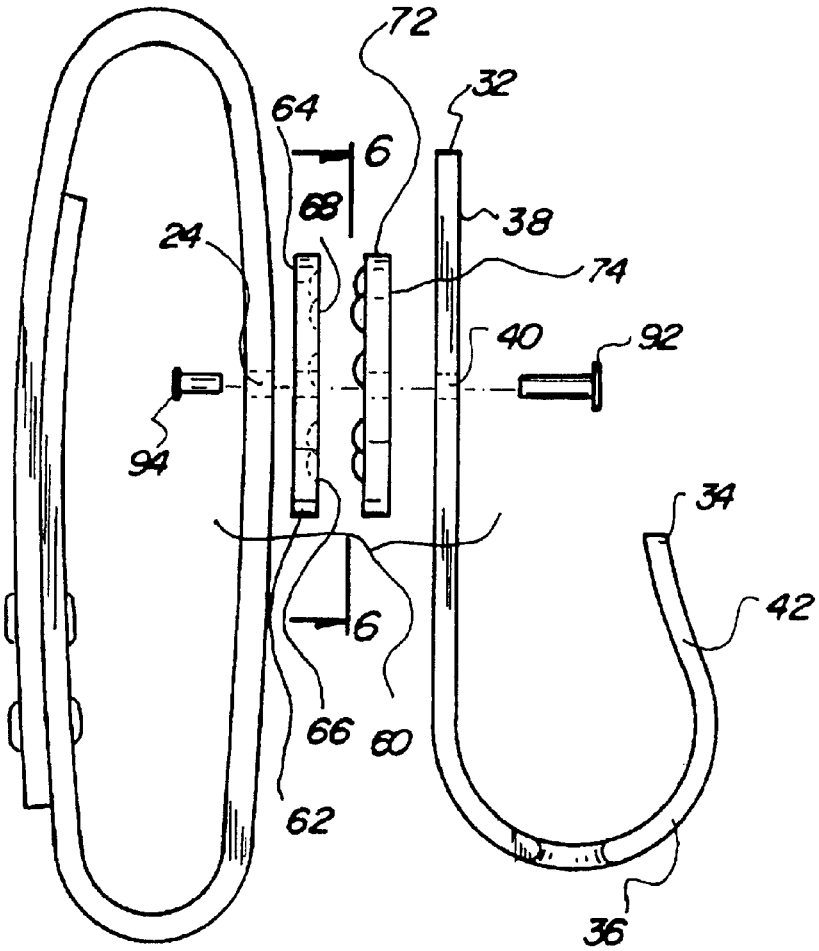
FIG. 5 is an exploded side-elevational view of the present invention.
Figure 6:
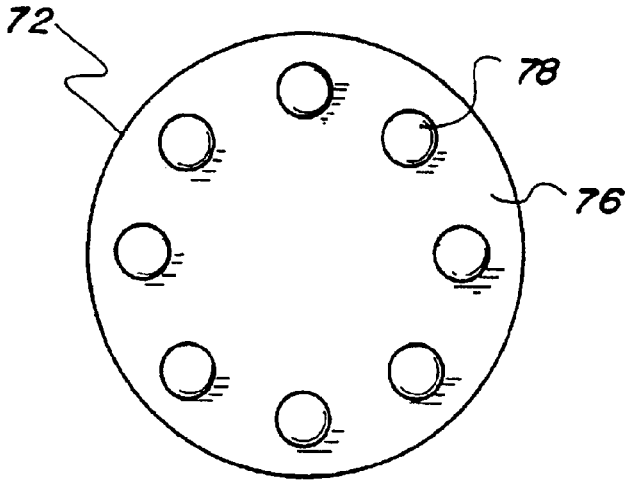
FIG. 6 is a view of one of the plates of the hook angle adjustment mechanism of the present invention taken along the line 6—6 of FIG. 5.
Figure 7:
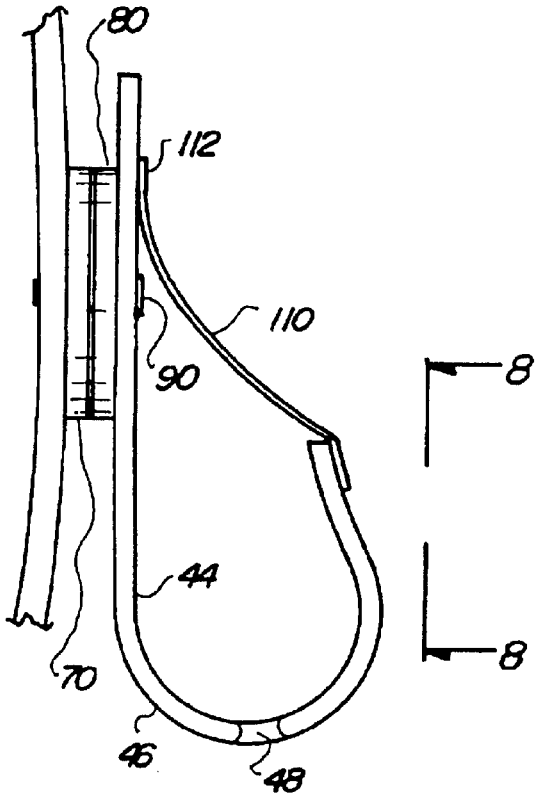
FIG. 7 is an alternate embodiment of the present invention including a rifle securement strap for ensuring that a pistol grip or stock of a rifle remains seated within the hook when being carried.

A hook 30 is also included. The hook is formed of a rigid metal and coated with rubber such as not to mar the finish of a rifle. The hook has an upper end 32, a lower end 34, and a bend 36 therebetween as shown in FIG. 5. The hook also has a generally straight long segment 38 with a generally circular through hole 40 formed thereon. The long segment is extended between the upper end 32 and an inboard portion of the bend 36. In addition, a short segment 42 is extended between an outboard portion of the bend and the lower end 34. As shown in FIG. 7, the hook has an inboard surface 44, an outboard surface 46, and a pair of opposed curved side edges 48 interconnecting the surfaces. Each side edge has a generally crescent-shaped cutout 50 formed thereon as best illustrated in FIG. 4. The cutouts are formed at a location coincident with the bend 36. Each cutout is sized for receiving a pistol grip 52 or a stock of a rifle as shown in FIG. 2. The cutout thereby precludes inadvertent movement of the pistol grip or stock when placed within the hook in contact with the inboard surface 44. Having the cutouts formed on each side of the hook also allows the hook to be used for supporting a rifle when slung over either the user's left or right shoulder.

To allow angular adjustment of the hook with respect to the belt securement strap 16, a hook angle adjustment mechanism 60 is provided as best illustrated in FIG. 5. The hook angle adjustment mechanism includes a rigid first plate 62. The first plate is annular in structure and formed of a rigid material such as metal. The first plate has a smooth inboard surface 64 that is adhesively affixed to the belt securement strap 16. When secured in this fashion, the first plate is placed in axial alignment with the through hole 24 of the belt securement strap. The first plate also has an outboard surface 66 with a plurality of spaced and concave indentations 68 formed thereon in a generally circular fashion. An inboard peripheral edge 70 interconnects the surfaces 64, 66.

The hook angle adjustment mechanism 60 also includes a second plate 72. The second plate is annular in structure and formed of a rigid material such a metal. The second plate has a smooth outboard surface 74 that is soldered to the hook 30. When coupled to the hook in this fashion, the second plate 72 is placed in axial alignment with the through hole 40 of the hook 30. The second plate also has an inboard surface 76 with a plurality of spaced and convex detents 78 projected outwards therefrom in a circular fashion. The detents are positioned such that when the first and second plate are axially aligned and placed in facing contact, the detents 78 are positionable within the indentations 68. An outboard peripheral edge 80 interconnects the surfaces 74, 76.

Lastly, the hook angle adjustment mechanism includes a generally cylindrical metal rivet 90. The rivet is formed of a nail 92 that is forcibly affixed to a seal 94 as shown in FIGS. 5 and 7. The rivet is extended within the through holes 24, 40 of the belt securement strap and the hook and is further extended through the plates 62, 72. The rivet sandwiches the plates between the belt securement strap 16 and the hook 30 yet allows rotation of the second plate with respect to first plate. In this sandwiched configuration, the detents of the second plate are positionable in a rotatable snap-type relation with the indentations 68 of the first plate. Thus, the angle of the hook with respect to the belt securement strap may be adjusted.

Figure 8:
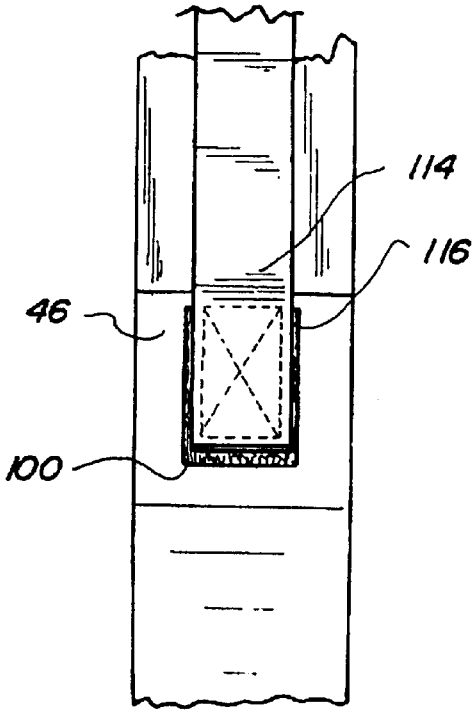
FIG. 8 is an enlarged view of the removable coupling of the rifle securement strap with the lower end of the hook.

A rectangular strip of pile-type fastener 100 is adhesively affixed to the outboard surface 46 of the hook near its lower end 34 as shown in FIG. 8. In addition, a flexible rectangular rifle securement strap 110 is provided. The strap is formed of leather or a canvas-type material. The strap has an upper end 112 adhesively affixed to the long segment 38 of the hook near the upper end 32. The rifle securement strap also has a lower end 114 with a rectangular strip of complimentary pile-type fastener 116 sewn thereto. The complimentary pile-type fastener is removably securable to the pile-type fastener 100 on the hook. When the fasteners 100 and 116 are secured, a closed loop configuration between the hook 30 and the rifle securement strap 110 is created. The rifle securement strap is thus utilized to hold a pistol grip or a stock of a rifle securely within the hook 30, thereby providing added carrying stability.

The present invention is a sling support or belt clip that distributes some of the load from a heavy rifle slung over the shoulder to a belt fastened around a user's waist. The present invention can be offered in several forms, enabling selection of the preferred type by the user, but basically it consists of a short leather belt securement strap with snap fasteners at each end. The snap fasteners allow the strap to be wrapped around the width of a belt of a user and closed in a loop. A hook is riveted to the belt securement strap and fits around the edge of a pistol grip or a gun stock of a rifle. The hook is about 1 inch wide and about 5 inches long and is rubber coated to prevent marring of a rifle. The hook swivels freely for use through the hook angle adjustment mechanism.

The present invention is attached on a belt before a rifle is slung over a user's shoulder. The pistol grip of the weapon is then directed into one of the cutouts of the hook. The unbalanced weight of the lower end of a slinged rifle causes it to swing naturally into the hook, thereby preventing the rifle from shifting further to one side and consequently pulling its associated sling off of a user's shoulder. When a user bends over, the rifle remains in place in the hook. If necessary, a tie down such as a rifle securement strap may be used to secure a pistol grip or a stock of a rifle within the hook. This feature is particularly important when a user has to rapidly move from one location to another. The present invention allows a rifle to be carried more comfortably and with less stress. Also, with the rifle is stabilized in a fixed position, both of the user's hands are hereby free to perform other activities. Thus, a user does not have to keep one thumb under a sling of a rifle to prevent it from sliding off his shoulder.

The present invention can be utilized with all types of slinged rifles including M16 assault rifles and other elongated weapons such as M60 machine guns. An advantage of the present invention is the reduction of stress on the shoulder of a user by displacing the weight of the rifle to a belt fastened around a user's waist. A user's back muscles are stronger and more capable of handling the weight of a rifle. The present invention also aids in preventing a rifle from slipping off of the shoulder by keeping it closer to a user's body. This allows free movement of both hands of a user. Furthermore, a user does not have to use his thumb to maintain a sling of a rifle upon his shoulder. For a hunter, the present invention keeps the rifle in a fixed configuration on his back, thereby allowing free movement of both hands to negotiate through brush and allowing quicker and more efficient access to the rifle. The present invention also prevents inadvertent movement of the rifle and prevents it from falling off a user's shoulder.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and the manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modification and changes will readily occur to those skilled in the art, it is not desired to limit the invention to the exact construction and operation shown and described, and accordingly, all suitable modification and equivalents may be resorted to, falling within the scope of the invention.

What is claimed as being new and desired to be protected by Letters Patent of the United States is as follows:

1. A rifle sling support apparatus comprising:

an elongated belt securement strap having a base end, a tip end, and securement means affixed to the ends for securing the strap in a closed loop configuration about a belt fastened about a user's waist;

a hook having an upper end, a lower end, a bend therebetween, and a pair of opposed cutouts formed on the bend and with each cutout sized for receiving a pistol grip or a stock of a rifle; and a hook angle adjustment means secured between the belt securement strap and hook for adjusting the angular position of the hook with respect to the belt securement strap.

2. The rifle sling support apparatus as set forth in claim 1 wherein the securement means is a plurality of snap fasteners.

3. The rifle sling support apparatus as set forth in claim 1 wherein the hook is coated with rubber.

4. The rifle sling support apparatus as set forth in claim 1 wherein the hook angle adjustment means comprises:

a first plate having an inboard surface affixed to the belt securement strap, an outboard surface with a plurality of spaced concave indentations formed thereon in a circular fashion, and an inboard peripheral edge interconnecting the surfaces;

a second plate having an outboard surface affixed to the hook, an inboard surface with a plurality of spaced convex detents projected outwards therefrom in a circular fashion, and an outboard peripheral edge interconnecting the surfaces; and a rivet extended through the belt securement strap and the hook and further extended through the plates to thereby sandwich the plates between the belt securement strap and the hook and place the detents in rotatable snap-type relation with the indentations.

5. The rifle sling support apparatus as set forth in claim 1 and further comprising:

a strip of pile-type fastener affixed to an outboard surface of the hook; and a rifle securement strap having an upper end affixed to the hook and a lower end with a strip of complimentary pile-type fastener affixed thereto and with the complimentary pile-type fastener removably securable to the pile-type fastener on the hook to define a closed loop configuration between the hook and the rifle securement strap.

6. The rifle sling support apparatus as set forth in claim 1 and further comprising a belt securable about a user's waist wherein said belt securement [strip] *strap* is securable thereto.

7. A rifle sling support apparatus for allowing a slinged rifle to be conveniently carried by a user from one location to another and for eliminating undue stress on the user's shoulder comprising, in combination:

a belt securable about a user's waist;

an elongated belt securement strap having a base end, a tip end, an intermediate portion therebetween with a through hole formed thereon, and a pair of snap fasteners affixed to the ends and with the fasteners removably securable for placing the belt securement strap in a closed loop configuration about the belt;

a rubber-coated hook having an upper end, a lower end, a bend therebetween, a generally straight long segment with a through hole formed thereon extended between the upper end and an inboard portion of the bend, and a short segment extended between an outboard portion of the bend and the lower end, the hook further having an inboard surface, an outboard surface, and a pair of opposed curved side edges interconnecting the surfaces and with each side edge further having a generally crescent-shaped cutout formed thereon at a location coincident with the bend and with each cutout sized for receiving a pistol grip or a stock of a rifle;

a hook angle adjustment mechanism for adjusting the angular position of the hook with respect to the belt securement strap, the hook angle adjustment mechanism further comprising:

an annular rigid first plate having a smooth inboard surface affixed to the belt securement strap in axial alignment with its through hole, an outboard surface with a plurality of spaced concave indentations formed thereon in a circular fashion, and an inboard peripheral edge interconnecting the surfaces;

an annular rigid second plate having a smooth outboard surface affixed to the hook in axial alignment with its through hole, an inboard surface with a plurality of spaced convex detents projected outwards therefrom in a circular fashion, and an outboard peripheral edge interconnecting the surfaces; and a rivet extended within the through holes of the belt securement strap and the hook and further extended through the plates to thereby sandwich the plates between the belt securement strap and the hook and place the detents of the second plate in rotatable snap-type relation with the indentations of the first plate;

a strip of pile-type fastener affixed to the outboard surface of the hook near the lower end thereof; and a flexible rifle securement strap having an upper end affixed to the long segment of the hook and a lower end with a strip of complimentary pile-type fastener affixed thereto and with the complimentary pile-type fastener removably securable to the pile-type fastener on the hook to define a closed loop configuration between the hook and the rifle securement strap.

*8. A rifle sling support apparatus comprising:*

*an elongated belt securement strap having a base end, a tip end, and a securement means affixed to the ends for securing the strap in a closed loop configuration about a belt, fastened about a user's waist;*

*a U-shaped securing portion interconnected to the securement strap, the securing portion having an upper end, a closed lower end, and a pair of opposed openings formed on the opposing sides of the securing portion with each opening being crescent shaped and sized for receiving a stock of a rifle; and*

*adjustment means for adjusting the angular position of the securing portion with respect to the securement strap.*

*9. A rifle sling support apparatus comprising:*

*an elongated belt securement strap having a base end, a tip end, and a securement means affixed to the ends for securing the strap in a closed loop configuration about a belt, fastened about a user's waist;*

*a U-shaped securing portion interconnected to the securement strap, the securing portion having an upper end, a closed lower end, and a pair of opposed openings formed on the opposing sides of the securing portion with each opening being crescent shaped and sized for receiving a stock of a rifle.*

* * * * *